US012309576B2

(12) United States Patent
van Mourik

(10) Patent No.: US 12,309,576 B2
(45) Date of Patent: May 20, 2025

(54) RE-CREATING ACOUSTIC SCENE FROM SPATIAL LOCATIONS OF SOUND SOURCES

(71) Applicant: Varjo Technologies Oy, Helsinki (FI)

(72) Inventor: Jelle van Mourik, Barcelona (ES)

(73) Assignee: Varjo Technologies Oy, Helsinki (FI)

( * ) Notice: Subject to any disclaimer, the term of this patent is extended or adjusted under 35 U.S.C. 154(b) by 261 days.

(21) Appl. No.: 18/187,052

(22) Filed: Mar. 21, 2023

(65) Prior Publication Data

US 2024/0323633 A1 Sep. 26, 2024

(51) Int. Cl.
*H04S 7/00* (2006.01)
*H04R 1/08* (2006.01)
*H04R 1/40* (2006.01)
*H04R 3/00* (2006.01)

(52) U.S. Cl.
CPC ............... *H04S 7/303* (2013.01); *H04R 1/08* (2013.01)

(58) Field of Classification Search
CPC ........... H04S 7/303; H04R 1/08; H04R 1/406; H04R 3/005
USPC ....................................... 381/26, 1, 300, 307
See application file for complete search history.

(56) References Cited

U.S. PATENT DOCUMENTS 10,726,861 B2 * 7/2020 Flaks .................... G10L 21/028
11,523,244 B1 * 12/2022 Meade .................. H04R 3/005

* cited by examiner

*Primary Examiner* — Thjuan K Addy
(74) *Attorney, Agent, or Firm* — Ziegler IP Law Group, LLC.

(57) ABSTRACT

An acoustic apparatus includes microphones to sense sounds in real-world environment and generate acoustic signals; and processor(s) configured to obtain 3D model of real-world environment; receive acoustic signals collected by microphones; process acoustic signals based on positions and orientations of microphones to estimate sound direction from which sound(s) corresponding to acoustic signals is incident upon microphones; determine position of sound source(s) from which sound(s) emanated, based on correlation between 3D model and sound direction; receive position of new user(s) in reconstructed environment; determine relative position of new user(s) with respect to sound source(s), based on position of new user(s) and position of sound source(s); and re-create sound(s) from perspective of new user(s), based on relative position of new user(s) with respect to sound source(s).

16 Claims, 4 Drawing Sheets

RE-CREATING ACOUSTIC SCENE FROM SPATIAL LOCATIONS OF SOUND SOURCES

TECHNICAL FIELD

The present disclosure relates to acoustic apparatuses for re-creating acoustic scenes from spatial locations of sound sources. The present disclosure also relates to methods for re-creating acoustic scenes from spatial locations of sound sources.

BACKGROUND

With advancements in evolving technologies such as immersive extended-reality (XR) technologies, demand for creating a realistic and immersive XR audio experience has been increasing. While creating a visual experience of a user in an XR environment is a critical aspect, sound plays an equally essential role in delivering an immersive and a believable experience for the user in the XR environment and in complementing said visual experience. Presence of high-quality sounds in the XR environment is important for guiding user's attention and enhancing emotional engagement of the user in the XR environment.

However, existing equipment and techniques for creating an XR audio experience are associated with several limitations. Some existing equipment and techniques naively utilise as-it-is recording of a sound collected from a perspective of a user present in an XR environment for other users present in the same XR environment, irrespective of different positions of the other users in the XR environment. In such a case, spatial information of the sound present in the recording is lost, and the other users do not perceive a location, a directionality, and a movement of the sound in the XR environment. Resultantly, audio as well as viewing experiences of the other users become highly unrealistic and non-immersive.

Therefore, in light of the foregoing discussion, there exists a need to overcome the aforementioned drawbacks associated with existing equipment and techniques for creating an XR audio experience.

SUMMARY

The present disclosure seeks to provide an acoustic apparatus for re-creating an acoustic scene from spatial locations of sound sources. The present disclosure also seeks to provide a method for re-creating an acoustic scene from spatial locations of sound sources. An aim of the present disclosure is to provide a solution that overcomes at least partially the problems encountered in prior art.

In a first aspect, an embodiment of the present disclosure provides an acoustic apparatus comprising:

- a plurality of microphones that are to be employed to sense sounds in a real-world environment and generate corresponding acoustic signals; and
- at least one processor configured to:
  - obtain a three-dimensional (3D) model of the real-world environment, the 3D model being represented in a given coordinate space;
  - receive a plurality of acoustic signals that are collected simultaneously by the plurality of microphones;
  - process the plurality of acoustic signals, based on positions and orientations of the plurality of microphones in the given coordinate space, to estimate a sound direction from which at least one sound corresponding to the plurality of acoustic signals is incident upon the plurality of microphones;
  - determine a position of at least one sound source, in the given coordinate space, from which the at least one sound emanated, based on a correlation between the 3D model and the estimated sound direction;
  - receive information indicative of a position of at least one new user in a given reconstructed environment that is reconstructed from the 3D model of the real-world environment, the position of the at least one new user being represented in the given coordinate space;
  - determine a relative position of the at least one new user with respect to the at least one sound source, based on the position of the at least one new user and the position of the at least one sound source; and
  - re-create the at least one sound from a perspective of the at least one new user, based on the relative position of the at least one new user with respect to the at least one sound source.

In a second aspect, an embodiment of the present disclosure provides a method comprising:

- obtaining a three-dimensional (3D) model of a real-world environment, the 3D model being represented in a given coordinate space;
- receiving a plurality of acoustic signals that are collected simultaneously by a plurality of microphones, wherein the plurality of microphones are employed to sense sounds in the real-world environment and to generate corresponding acoustic signals;
- processing the plurality of acoustic signals, based on positions and orientations of the plurality of microphones in the given coordinate space, to estimate a sound direction from which at least one sound corresponding to the plurality of acoustic signals is incident upon the plurality of microphones;
- determining a position of at least one sound source, in the given coordinate space, from which the at least one sound emanated, based on a correlation between the 3D model and the estimated sound direction;
- receiving information indicative of a position of at least one new user in a given reconstructed environment that is reconstructed from the 3D model of the real-world environment, the position of the at least one new user being represented in the given coordinate space;
- determining a relative position of the at least one new user with respect to the at least one sound source, based on the position of the at least one new user and the position of the at least one sound source; and
- re-creating the at least one sound from a perspective of the at least one new user, based on the relative position of the at least one new user with respect to the at least one sound source.

Embodiments of the present disclosure substantially eliminate or at least partially address the aforementioned problems in the prior art, and facilitate accurate, reliable, high-quality re-creation of an acoustic scene from spatial locations of sound sources, thereby providing a highly realistic and immersive audio experience to the new user(s), in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3A illustrates a schematic illustration of a three-dimensional (3D) space of a real-world environment in which a first user is present, while

FIG. 5A is a side view of a conical region of interest, while

Figure 1:
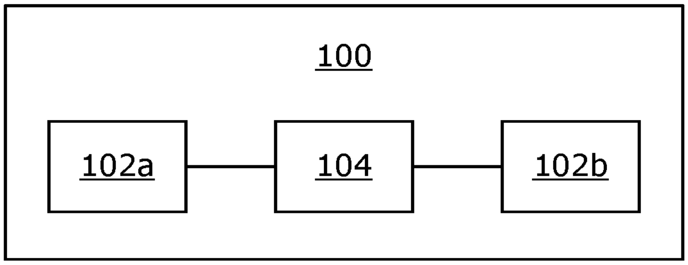
FIG. 1 illustrates a block diagram of an architecture of an acoustic apparatus for re-creating acoustic scene from spatial locations of sound sources, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an acoustic apparatus comprising:

a plurality of microphones that are to be employed to sense sounds in a real-world environment and generate corresponding acoustic signals; and at least one processor configured to:

- obtain a three-dimensional (3D) model of the real-world environment, the 3D model being represented in a given coordinate space;
- receive a plurality of acoustic signals that are collected simultaneously by the plurality of microphones;
- process the plurality of acoustic signals, based on positions and orientations of the plurality of microphones in the given coordinate space, to estimate a sound direction from which at least one sound corresponding to the plurality of acoustic signals is incident upon the plurality of microphones;
- determine a position of at least one sound source, in the given coordinate space, from which the at least one sound emanated, based on a correlation between the 3D model and the estimated sound direction;
- receive information indicative of a position of at least one new user in a given reconstructed environment that is reconstructed from the 3D model of the real-world environment, the position of the at least one new user being represented in the given coordinate space;
- determine a relative position of the at least one new user with respect to the at least one sound source, based on the position of the at least one new user and the position of the at least one sound source; and
- re-create the at least one sound from a perspective of the at least one new user, based on the relative position of the at least one new user with respect to the at least one sound source.

In a second aspect, an embodiment of the present disclosure provides a method comprising:

- obtaining a three-dimensional (3D) model of a real-world environment, the 3D model being represented in a given coordinate space;
- receiving a plurality of acoustic signals that are collected simultaneously by a plurality of microphones, wherein the plurality of microphones are employed to sense sounds in the real-world environment and to generate corresponding acoustic signals;
- processing the plurality of acoustic signals, based on positions and orientations of the plurality of microphones in the given coordinate space, to estimate a sound direction from which at least one sound corresponding to the plurality of acoustic signals is incident upon the plurality of microphones;
- determining a position of at least one sound source, in the given coordinate space, from which the at least one sound emanated, based on a correlation between the 3D model and the estimated sound direction;
- receiving information indicative of a position of at least one new user in a given reconstructed environment that is reconstructed from the 3D model of the real-world environment, the position of the at least one new user being represented in the given coordinate space;
- determining a relative position of the at least one new user with respect to the at least one sound source, based on the position of the at least one new user and the position of the at least one sound source; and
- re-creating the at least one sound from a perspective of the at least one new user, based on the relative position of the at least one new user with respect to the at least one sound source.

The present disclosure provides the aforementioned acoustic apparatus and the aforementioned method for facilitating accurate, reliable, high-quality re-creation of an acoustic scene from spatial locations of sound sources, thereby providing a highly realistic and immersive audio experience to the new user(s), in real time or near-real time. Herein, the sound direction is accurately estimated by processing the plurality of acoustic signals, and the position of the at least one sound source is determined using the sound direction and the 3D model. Thus, the at least one sound is re-created from the perspective of the at least one new user, the at least one re-created sound being spatially accurate (for example, in terms of intensity and direction of the at least one sound), and being highly in-sync according to the relative position of the at least one new user with respect to the at least one sound source. Advantageously, an audio experience of the at least one new user aligns well with a viewing experience of the at least one new user, thereby enabling an entire audio and viewing experience of the at least one new user to be highly realistic and immersive within the given reconstructed (extended-reality) environment. The method and the acoustic apparatus are simple, robust, support real-time high-quality 3D re-creation of sounds, and can be implemented with ease.

It will be appreciated that the acoustic apparatus facilitates in collecting and processing the plurality of acoustic signals to estimate the sound direction, and then determining the position of the at least one sound source from which the at least one sound emanated, for re-creating the at least one sound from the perspective of the at least one new user present in the given reconstructed environment.

Throughout the present disclosure, the term "microphone" refers to a specialised equipment that is capable of sensing and converting the sounds in the real-world environment into acoustic signals. The term "acoustic signal" refers to an electrical signal that represents a sound in the real-world environment. The aforesaid conversion is generally performed by a transducer (for example, such as an electromagnetic transducer) arranged inside a given microphone. Microphones are well-known in the art.

It will be appreciated that the sounds in the real-world environment are generated by the at least sound source present in the real-world environment. The at least one sound source could be located in a vicinity of the plurality of microphones, or be located at a considerable distance from the plurality of microphones, in the real-world environment. Throughout the present disclosure, the term "sound source" refers to an object from which a sound emanates. Such an object could be a living object (for example, such as a human, an animal, and the like) or a non-living object (for example, such as a musical instrument, an electronic device, a vehicle, and the like). The musical instrument could, for example, be a guitar, a plano, a drum, a violin, or the like. The electronic device could, for example, be a television, a cell phone, an alarm clock, a speaker, or the like. The sounds in the real-world environment could also be generated due to wind, thunders, waterfalls, birds chirping, or the like.

Optionally, the plurality of microphones are arranged (namely, mounted) on a device present in the real-world environment. In some implementations, said device is arranged at a fixed location within the real-world environment. In such implementations, said device is stationary within the real-world environment. In other implementations, said device is a wearable device being worn by a given user present in the real-world environment. In such implementations, a location of said device (and therefore, a location of a given microphone arranged on said device) changes with a change in a location of the given user. Alternatively, said device could be arranged, for example, on a drone, a robot, or similar. As an example, the device could be arranged on a support structure that is capable of a three-dimensional (3D) rotation (and additionally, capable of a translation motion). The support structure could be moved to any required location in the real-world environment. Beneficially, in this case, the given microphone (arranged on said device) is movable in the real-world environment to be able to capture the sounds from different positions and/or different directions in the real-world environment.

Examples of the device include, but are not limited to, a head-mounted display (HMD) apparatus and a teleport device. The term "head-mounted display" apparatus refers to a specialized equipment that is configured to present an extended-reality (XR) environment to a given user when said HMD apparatus, in operation, is worn by the given user on his/her head. The HMD apparatus is implemented, for example, as an XR headset, a pair of XR glasses, and the like, that is operable to display a scene of the XR environment to the given user. The term "extended-reality" encompasses virtual reality (VR), augmented reality (AR), mixed reality (MR), and the like. The term "teleport device" refers to a specialized equipment that is capable of facilitating virtual teleportation.

In some implementations, the acoustic apparatus is integrated with the HMD apparatus. In such implementations, all elements of the acoustic apparatus are physically coupled to the HMD apparatus (for example, attached via mechanical and/or electrical connections to components of the HMD apparatus). Optionally, in such implementations, a processor of the HMD apparatus serves as the at least one processor of the acoustic apparatus. Alternatively, optionally, in such implementations, the at least one processor of the acoustic apparatus is communicably coupled to the processor of the HMD apparatus.

In other implementations, at least one element (such as the at least one processor) of the acoustic apparatus is implemented separately from the HMD apparatus. In such implementations, the acoustic apparatus is implemented in a distributed manner. Optionally, in this regard, the plurality of the microphones of the acoustic apparatus are arranged on the HMD apparatus, and the at least one processor of the acoustic apparatus and the processor of the HMD apparatus are communicably coupled. As an example, the at least one processor of the acoustic apparatus could be implemented as a processor of a computing device that is communicably coupled to the HMD apparatus. The computing device could, for example, be a laptop, a desktop, a tablet, a phablet, a personal digital assistant, a workstation, a console, or similar. As another example, the at least one processor of the acoustic apparatus could be implemented as at least one server that is communicably coupled to the HMD apparatus. The at least one server may, for example, be implemented as a cloud server.

In some implementations, the plurality of microphones are arranged on a wearable device (for example, an HMD apparatus) associated with a given user present in the real-world environment, wherein the at least one sound is re-created from perspectives of other users present in different real-world environments (namely, different geographical locations than the real-world environment in which the given user is present). In other implementations, the plurality of microphones are arranged on a stationary device (for example, a teleport device) present in the real-world environment, wherein the at least one sound is re-created from perspectives of different users present in different real-world environments (namely, different geographical locations than the real-world environment in which the stationary device is present). This is particularly beneficial, for example, in a case of virtual teleportation.

Notably, the at least one processor controls an overall operation of the acoustic apparatus. The at least one processor is at least communicably coupled to at least the plurality of microphones.

Throughout the present disclosure, the term "three-dimensional model" of the real-world environment refers to a data structure that comprises comprehensive information pertaining to a 3D space of the real-world environment. Such comprehensive information is indicative of at least one of: surfaces of objects or their parts present in the real-world environment, a plurality of features of the objects or their parts, shapes and sizes of the objects or their parts, poses of the objects or their parts, materials of the objects or their parts, types of objects present in the real-world environment, colour and depth information of the objects or their portions, light sources and lighting conditions within the real-world environment. The term "object" refers to a physical object or a part of the physical object present in the real-world environment. An object could be a living object (for example, such as a human, a pet, a plant, and the like) or a non-living object (for example, such as a wall, a window, a curtain, a toy, a poster, a lamp, a speaker, a radio, a television, and the like). Examples of the plurality of features include, but are not limited to, edges, corners, blobs and ridges.

Optionally, the 3D model of the real-world environment is in a form of at least one of: a 3D polygonal mesh, a 3D point cloud, a 3D surface cloud, a 3D surflet cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh. The aforesaid forms of the 3D model are well-known in the art.

In an embodiment, the at least one processor is configured to obtain the 3D model of the real-world environment from at least one data repository communicably coupled to the at least one processor. In such a case, the 3D model is pre-generated (for example, by the at least one processor), and pre-stored at the at least one data repository. It will be appreciated that the at least one data repository could, for example, be implemented as a memory of the at least one processor, a memory of the device, a memory of the computing device, a removable memory, a cloud-based database, or similar. Optionally, the acoustic apparatus further comprises the at least one data repository.

In another embodiment, when obtaining the 3D model of the real-world environment, the at least one processor is configured to generate the 3D model from a plurality of colour images and a plurality of depth images (corresponding to the plurality of colour images), based on corresponding viewpoints from which the plurality of colour images and the plurality of depth images are captured. Optionally, the at least one processor is configured to employ at least one data processing algorithm for processing the aforesaid colour images and the aforesaid depth images to generate the 3D model. The at least one data processing algorithm could be at least one of: a feature extraction algorithm, an image stitching algorithm, an image merging algorithm, an interpolation algorithm, a 3D modelling algorithm, a photogrammetry algorithm, an image blending algorithm. Such data processing algorithms are well-known in the art. It will be appreciated that the plurality of colour images, the plurality of depth images, and viewpoint information indicative of the corresponding viewpoints could be received by the at least one processor from any of:

(i) a device comprising pose-tracking means and at least one camera implemented as a combination of a visible-light camera and a depth camera, or
(ii) a data repository in which the plurality of colour images, the plurality of depth maps, and the viewpoint information are pre-stored.

Herein, the term "camera" refers to an equipment that is operable to detect and process light signals received from the real-world environment, so as to capture images of the real-world environment. Optionally, a given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Additionally, optionally, the given camera is implemented as a depth camera. Examples of the depth camera include, but are limited to, a Time-of-Flight (ToF) camera, a light detection and ranging (LIDAR) camera, a Red-Green-Blue-Depth (RGB-D) camera, a laser rangefinder, a stereo camera, a plenoptic camera, an infrared (IR) camera, a ranging camera, a Sound Navigation and Ranging (SONAR) camera. The term "viewpoint" encompasses both a viewing position at which the at least one camera is positioned in the real-world environment as well as a viewing direction in which the at least one camera is capturing a given colour image and a given depth image.

The given coordinate space is used to describe a position and an orientation of an object within the 3D space of the real-world environment. As an example, the given coordinate space may be a Cartesian coordinate space. Optionally, the given coordinate space has a predefined origin and three mutually perpendicular coordinate axes. The three mutually perpendicular coordinate axes could be, for example, X, Y, and Z axes. Optionally, in this regard, a 3D position of a point in the given coordinate space is expressed as (x, y, z) position coordinates along the X, Y and Z axes, respectively. Likewise, an orientation in the given coordinate space could be expressed, for example, using rotation quaternions, Euler angles, rotation matrices, or similar.

Notably, the plurality of microphones sense (namely, capture) the sounds in the real-world environment simultaneously, to generate the plurality of acoustic signals, and beneficially provide the plurality of acoustic signals to the at least one processor in real time or near-real time. It will be appreciated that the plurality of microphones could be spatially arranged on the device in a manner that the sounds in the real-world environment can be sensed from different directions and/or different locations. Advantageously, this allows different microphones to capture the sounds from different perspectives, i.e., in a comprehensive and a spatially-variable manner. It will also be appreciated that simultaneous collection of the plurality of acoustic signals from multiple microphones allows for creating immersive and realistic audio experiences, for example, such as in XR applications.

Notably, a knowledge of the positions and the orientations of the plurality of microphones enables to process the plurality of acoustic signals to estimate the sound direction. Optionally, in this regard, the at least one processor is configured to employ at least one data processing technique. Optionally, the at least one data processing technique is at least one of: a coherence-based direction of arrival (DOA) estimation technique, an Ambisonic intensity-based DOA estimation technique, a minimum variance distortion-less response (MVDR) beamforming technique, an acoustic intensity vector sensor (IVS) technique, a generalized cross-correlation with phase transform (GCC-PHAT) technique, a time delay estimation (TDE) technique. The aforesaid techniques for determining the sound direction are well-known in the art. It will be appreciated that machine learning (ML)-based techniques could also be utilised for estimating the sound direction. Such ML-based techniques are described, for example, in "*A multi-room reverberant dataset for sound event localization and detection*" by S. Adavanne et al., published in Proceedings of the Detection and Classification of Acoustic Scenes and Events Workshop (DCASE2019), pp. 10-14, October 2019; in "*Sound event localization and detection of overlapping sources using convolutional recurrent neural networks*" by S. Adavanne et al., published in IEEE Journal of Selected Topics in Signal Processing, Vol. 13, Issue 1, pp. 34-48, March 2018; and in "*CRNN-Based Multiple DoA Estimation Using Acoustic Intensity Features for Ambisonics Recordings*" in IEEE Journal of Selected Topics in Signal Processing, Vol. 13, Issue 1, pp. 22-33, March 2019, which have been incorporated herein by reference.

In an embodiment, the plurality of acoustic signals are processed to determine the sound direction by using beamforming. Optionally, in this regard, the plurality of acoustic signals are captured by the plurality of microphones that are arranged in a form of a beamforming array. Such a beamforming array could, for example, be a linear array, a circular array, a planar array, or similar. When a sound (in the form of waves) from a given sound source propagates in the 3D space of the real-world environment, the sound arrives at each microphone in the array at (slightly) different times due to a difference in a distance between the given sound source and each microphone. Said difference in arrival time is utilised for determining the sound direction using beamforming algorithms, which are well-known in the art. It will be appreciated that prior to determining said difference, the plurality of acoustic signals are optionally spatially filtered for removing unwanted noise or interference present in the plurality of acoustic signals. Moreover, it will also be appreciated that the sound direction can be represented using a vector indicating a direction of incidence of the sound upon the given microphone. Beamforming and its application for determining the sound direction are well-known in the art.

In an additional embodiment, when processing the plurality of acoustic signals, the at least one processor is configured to calculate an angle of incidence of the at least one sound for each of the plurality of microphones, based on at least one parameter of each of the plurality of acoustic signals and distances between the plurality of microphones. In this regard, the at least one sound can be incident upon the plurality of microphones from any direction in the 3D space of the real-world environment. Thus, an angle of incidence of the at least one sound could be different for each of the plurality of microphones, depending on a pre-known arrangement of the plurality of microphones. The technical benefit of calculating the angle of incidence of the at least one sound for each of the plurality of microphones is that it facilitates in determining the sound direction with an acceptably high accuracy, because the angle of incidence of the at least one sound provides a basis for determining the sound direction. Furthermore, the position of the at least one sound source can also be accurately and precisely determined (for example, using triangulation). It is to be understood that the distances between the plurality of microphones are known to the at least one processor. Such distances may, for example, be expressed in millimetres, centimetres, or similar.

Optionally, the at least one parameter of each of the plurality of acoustic signals comprises at least one of: an intensity of an acoustic signal generated by a given microphone, a signal-to-noise ratio for the given microphone, a time-of-arrival of a sound captured by the given microphone. It will be appreciated that processing of the plurality of acoustic signals could also be performed based on the aforesaid at least one parameter in different frequency bands, for calculating the angle of incidence separately for each band.

Optionally, an angle of incidence of the at least one sound for a given microphone is calculated, based on a difference between an intensity of an acoustic signal generated by the given microphone and an intensity of an acoustic signal generated by at least one other microphone, and a distance between the given microphone and the at least one other microphone. Such calculation can be performed using at least one trigonometry-based formula. In an example, said difference may be a difference between sound pressure levels received by the two aforesaid microphones. Said difference would be processed in a linear domain, for calculating the angle of incidence.

Optionally, an angle of incidence of the at least one sound for a given microphone is calculated, based on a difference between a signal-to-noise ratio for the given microphone and a signal-to-noise ratio for at least one other microphone, and a distance between the given microphone and the at least one other microphone. Such calculation can be performed using at least one trigonometry-based formula. A signal-to-noise ratio for a microphone can be calculated by dividing an intensity of an acoustic signal captured by the microphone by an intensity of a noise signal captured by the microphone. The intensity of the acoustic signal may be measured as a sound pressure level, while the intensity of the noise signal may be measured as a root-mean-square (RMS) of the noise signal.

Optionally, an angle of incidence of the at least one sound for a given microphone is calculated, based on a difference between a time-of-arrival of a sound captured by the given microphone and a time-of-arrival of the sound captured by at least one other microphone, and a distance between the given microphone and the at least one other microphone. Such calculation can be performed using at least one trigonometry-based formula. A given time-of-arrival of the sound may, for example, be expressed in milliseconds, seconds, or similar.

It will be appreciated that calculation of the angle of incidence of the at least one sound for the given microphone using any of the three aforementioned ways is frequency-dependent. Thus, the aforesaid calculation could be performed for an entirety of a frequency spectrum and/or for some filtered parts of the frequency spectrum. Employing frequency-dependent processing and band-pass filtering for calculating the angle of incidence of the at least one sound are well-known in the art.

In an alternative or additional embodiment, when processing the plurality of acoustic signals, the at least one processor is configured to:

create a spherical sound field, based on at least one parameter of each of the plurality of acoustic signals and the positions and orientations of the plurality of microphones; and determine an angle of incidence of the at least one sound for an origin of the spherical sound field.

Herein, the term "spherical sound field" refers to a sound field that is created by collecting sounds from all directions in the 3D space of the real-world environment. The spherical sound field not only represents directional information of the at least one sound in the real-world environment, but can also represent spatial characteristics of the at least one sound. It will be appreciated that, for creating the spherical sound field, the plurality of microphones are spatially arranged in particular positions and orientations. In an example, the plurality of microphones may be arranged in a polygonal array, a polyhedral array or a spherical array. Since the positions and the orientations of the plurality of microphones are known, and the at least one parameter of each of the plurality of acoustic signals is also known, the at least one processor can create the spherical sound field by using at least one data processing technique. Optionally, in this regard, the at least one data processing technique is at least one of: an Ambisonic encoding technique, a wave field synthesis technique, a channel-based technique. The channel-based technique is an acoustic signal processing technique based on individual audio channels in a known audio configuration, for example, such as a stereo configuration having two audio channels, a 5.1 configuration having six channels, a 7.1 configuration having eight channels, a 7.4.1 configuration having eleven channels, or similar. All the aforesaid techniques are well-known in the art. Once the spherical sound field is created, the angle of incidence of the at least one sound can be easily determined with respect to the origin of the spherical sound field, instead of calculating the angle of incidence of the at least one sound for each of the plurality of microphones. The angle of incidence of the at least one sound determined in this manner would be highly accurate and reliable.

Optionally, the plurality of microphones are arranged in a form of an Ambisonic array, wherein the spherical sound field is created with respect to an origin of the Ambisonic array. In this regard, the spherical sound field is an Ambisonic sound field that is created with respect to the origin of the Ambisonic array. Typically, the Ambisonic array comprises four or more microphones that are arranged in the 3D space of the real-world environment at specific angles and specific distances from each other, in order to capture the at least one sound from all the directions. In an example, the Ambisonic array may comprise four omnidirectional microphones arranged in a tetrahedral shape. Upon capturing the at least one sound using the four omnidirectional microphones, acoustic signals corresponding to the at least one sound could be post-processed in a way that combines directional information from said microphones into four channels: one channel (for example, W channel) for a pressure of the sound, and three channels (for example, X, Y, and Z channels) for directions of the sound along X-axis, Y-axis, and Z-axis, respectively. In this way, a 3D representation of the at least one sound can be created as the Ambisonic sound field, thereby allowing for an accurate spatial reproduction of the at least one sound from a given perspective. The ambisonic array and techniques for creating the Ambisonic sound field are well-known in the art.

It will be appreciated that the Ambisonic array may also comprise more than four omnidirectional microphones when employing higher order Ambisonics for creating the spherical sound field. For example, 9 omnidirectional microphones may be used for a second order Ambisonics, 16 omnidirectional microphones may be used for a third order Ambisonics, 36 omnidirectional microphones may be used for a fourth order Ambisonics, 64 omnidirectional microphones may be used for a fifth order Ambisonics, and so on. It will also be appreciated that non-Ambisonic microphones (namely, microphones that are not exclusively compatible for Ambisonics) could also be used for capturing the at least one sound. Then, the acoustic signals corresponding to the at least one sound could be post-processed to create an Ambisonic acoustic signals signal. For the aforesaid post-processing, the at least one processor may utilise a data processing technique, for example, such as a Vector-based Amplitude Panning (VBAP) technique.

Optionally, the plurality of microphones are mounted on a head-mounted display apparatus of a first user. Optionally, in this regard, the at least one processor is configured to:

receive information indicative of a head pose of the first user;

determine a change in the head pose of the first user over a given time period during which the plurality of acoustic signals are collected;

determine a change in the positions and the orientations of the plurality of microphones, based on the change in the head pose of the first user; and process the plurality of acoustic signals, based further on the change in the positions and the orientations of the plurality of microphones, to determine the sound direction.

In this regard, when the plurality of microphones are mounted on the HMD apparatus of the first user and the first user moves his/her head while viewing a certain region in a scene of an XR environment, there would be a change in the head pose of the first user and the positions and the orientations of the plurality of microphones would also change accordingly. The technical benefit of taking the change in the positions and the orientations of the plurality of microphones into account is that it allows for more accurate and reliable estimation of the sound direction. This subsequently facilitates in accurately determining the position of the at least one sound source. This is because head-pose tracking can be beneficially used to compensate for changes and errors in acoustic signals, and therefore, to get a more accurate sense of the sound direction.

Optionally, the at least one processor receives the information indicative of the head pose of the first user from a pose-tracking means of the HMD apparatus. The term "pose-tracking means" refers to specialized equipment that is employed to detect and/or follow a head pose of a given user within the real-world environment, when the given user wears the HMD apparatus on his/her head. The term "pose" encompasses position and/or orientation. In practice, the pose-tracking means is actually employed to track a pose of the HMD apparatus; the head pose of the given user corresponds to the pose of the HMD apparatus as the HMD apparatus is worn by the given user on his/her head. The term "given user" encompasses at least the first user.

Pursuant to embodiments of the present disclosure, the pose-tracking means is implemented as a true sixDegrees of Freedom (6DoF) tracking system. In other words, said pose-tracking means is configured to track translational movements (namely, surge, heave and sway movements) and rotational movements (namely, roll, pitch and yaw movements) of the head of the given user within the 3D space of the real-world environment. The pose-tracking means could be implemented as an internal component of the HMD apparatus, as a tracking system external to the HMD apparatus, or as a combination thereof. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader. Optionally, a processor of the HMD apparatus is configured to employ at least one data processing algorithm to process pose-tracking data collected by the pose-tracking means, to determine the head pose of the given user. The pose-tracking data may be in the form of images, IMU/TIMU values, motion sensor data values, magnetic field strength values, or similar. Examples of the at least one data processing algorithm include, but are not limited to, a feature detection algorithm, an environment mapping algorithm, and a data extrapolation algorithm.

It will be appreciated that the pose-tracking means continuously tracks the head pose of the first user throughout a given session of using the HMD apparatus. In such a case, the at least one processor continuously receives the information indicative of the head pose of the first user (in real time or near-real time), and thus the change in the head pose of the first user over the given time period can be easily and accurately determined. Moreover, since the plurality of microphones are mounted on the HMD apparatus, positions and orientations of the plurality of microphones with respect to the HMD apparatus are fixed (i.e., do not change) and are known already. When the head pose of the first user changes, the positions and the orientations of the plurality of microphones in the given coordinate space change. In this regard, optionally, the at least one processor is configured to determine the change in the positions and the orientations of the plurality of microphones in the given coordinate space, based on the change in the head pose of the first user and the positions and the orientations of the plurality of microphones with respect to the HMD apparatus. This can be done, for example, by using at least a coordinate geometry-based technique and/or a trigonometry-based technique.

It will also be appreciated that when the at least one sound source is emanating the at least one sound repeatedly, and the first user is continuously moving his/her head in the real-world environment, the sound direction from a perspective of the first user would also change continuously. Therefore, during the given time period, the plurality of microphones collect different acoustic signals (for example, in terms of an intensity, a signal-to-noise ratio, a time-of-arrival). These acoustic signals are then processed to determine the sound direction (as explained earlier).

Notably, the position of the at least one sound source (namely, a spatial location of the at least one sound source in the real-world environment) is determined using the correlation between the 3D model and the estimated sound direction. Optionally, the at least one processor is configured to determine the correlation between the 3D model and the estimated sound direction by mapping the estimated sound direction on to the 3D model. In such a case, the at least one processor is configured to use the aforesaid correlation to easily ascertain which object(s) (represented in the 3D model) could highly likely be the at least one sound source, and thus the position of the at least one sound source can be easily determined. Moreover, the correlation may also indicate a particular region in the 3D model whereat the at least one sound source is highly likely to be located in the 3D model and wherefrom the at least one sound possibly emanates.

Optionally, the at least one processor is configured to:
- determine a conical region of interest in the 3D model, wherein an axis of the conical region of interest is the estimated sound direction;
- identify at least one object that is present at least partially in the conical region of interest; and
- consider the at least one object as the at least one sound source.

The term "conical region of interest" in the 3D model refers to an imaginary 3D cone defined by the estimated sound direction. The conical region of interest is a region in the 3D model whereat the at least one sound source is highly likely to be located in the 3D model and wherefrom the at least one sound possibly emanates. Thus, the at least one object lying within the conical region of interest is a potential object which could be the at least one sound source. The conical region of interest may be in a shape of a right circular cone or an oblique cone. Optionally, an apex angle of a cone formed by the conical region of interest lies in a range of 5 degrees to 90 degrees. More optionally, the apex angle of the cone formed by the conical region of interest lies in a range of 5 degrees to 25 degrees. The term "apex angle" refers to a maximum angle that extends between boundaries of the cone that define an apex of said cone. In an example, the apex angle of the cone formed by the conical region of interest may be 20 degrees. It will be appreciated that since the 3D model is readily available to the at least one processor, locations of a plurality of objects or their portions represented in the 3D model are accurately known to the at least one processor. Therefore, the at least one object that is present at least partially in the conical region of interest is easily and accurately identified by the at least one processor using the 3D model. Upon such identification, the at least one object can be considered as the at least one sound source.

Optionally, the at least one processor is configured to identify an object category of the at least one object, wherein the at least one object is considered as the at least one sound source, when the object category of the at least one object matches the at least one sound. In this regard, when the at least one object (whether multiple objects or a single object) is present at least partially in the conical region of interest, for the at least one object to be considered as the at least one sound source, characteristics of the at least one object must comply with the at least one sound. In other words, the at least one object that is to be considered as the at least one sound source must be acceptably relevant to the at least one sound. Thus, the at least one processor is configured to identify the object category of the at least one object, and only when the at least one sound belongs to the object category of the at least one object, the at least one object is considered as the at least one sound source. Optionally, when identifying the object category, the at least one processor is configured to employ at least one of: a polygons-of-interest detection technique, a point cloud depth variance estimation technique, an ML-based labelling algorithm, a face detection technique. The "polygons-of-interest detection technique" is a computer vision technique that involves identifying contours of the at least one object present at least partially in the conical region of interest by tracing its edges or boundaries. The "point cloud depth variance estimation technique" is a technique that uses depth data in a 3D model implemented as a 3D point cloud to estimate a depth of the at least one object by analysing a variance in depth values. The "ML-based labelling algorithm" is an algorithm that is used to label objects based on their features or characteristics, for example, in form of notes, comments, descriptions, and the like. Such an algorithm could be trained on a large dataset of labelled images to accurately recognize objects and their categories. The "face detection technique" is a technique for detecting facial features (for example, such as eyes, nose, mouth, and the like) of a human present in the real-world environment. The aforesaid techniques/algorithm are well-known in the art.

It will be appreciated that information pertaining to sounds belonging to (namely, matching) a plurality of object categories of objects could be pre-determined by the at least one processor, and could be stored at and accessed from the at least one data repository. The term "object category" refers to a type of object. As an example, the object category may be "living being", and an object belonging to such an object category may be a human, an animal, and the like. When the object is the human, the at least one sound would be related to spoken words, singing voice, human speech, a sound effect produced by a human voice (such as a whistle, a scream, or similar), and the like. When the object is the animal, the at least one sound would be related to a sound made by the animal, for example, such as roar, bark, growl, meow, hoot, and the like. As another example, the object category may be "musical instruments", and objects belonging to such an object category may be a guitar, a sitar, a drum, a plano, and the like. As yet another example, the object category may be "electronic devices", and objects belonging to such an object category may be a television, a speaker, and the like. It will be appreciated that the objects can also be identified and categorised into the plurality of object categories using at least one neural network. Moreover, the sounds could be matched to the plurality of object categories, based on characteristics of the sounds produced by those object categories.

In an example, when the at least one sound may be human speech, the at least one processor may utilise ML-based labelling algorithm to identify a human as the at least one sound source in the conical region of interest in the 3D model, and may utilise the face detection algorithm to identify a face of the human for virtually superimposing the face to the at least one identified sound source.

Furthermore, the position of the at least one new user is received by the at least one processor in real time or near-real time. The at least one new user could physically be located in a different real-world environment, and virtually be present in the given reconstructed environment that is reconstructed from the 3D model. Optionally, the at least one processor is configured to receive the information indicative of the position of at least one new user from a processor of a device of the at least one new user, the at least one processor of the acoustic apparatus and the processor of said device being communicably coupled with each other. Optionally, in this regard, the at least one processor of the acoustic apparatus is configured to generate the given reconstructed environment from the 3D model, and utilise the given reconstructed environment to re-create acoustic scenes from a perspective of the at least one new user. The position of the at least one new user can be any arbitrary position in the given coordinate space. Techniques for reconstructing the given reconstructed environment using the 3D model are well-known in the art.

Once the position of the at least one new user and the position of the at least one sound source are known to the at least one processor, the at least one processor can easily ascertain the relative position of the at least one new user with respect to the at least one sound source, i.e., how far the at least one new user is located from the at least one sound source in the given reconstructed environment, and how the at least one new user is oriented with respect to the at least one sound source. This can be determined, for example, using a coordinate geometry-based technique.

Notably, the at least one processor re-creates the at least one sound from the perspective of the at least one new user by taking into account the relative position of the at least one new user with respect to the at least one sound source. In other words, the re-creation is performed based on how far the at least one new user is from the at least one sound source, and/or how the at least one new user is oriented with respect to the at least one sound source. Optionally, when re-creating the at least one sound from the perspective of the at least one new user, the at least one processor is configured to modify at least one of: a direction, an intensity, of the at least one sound according to the relative position of the at least one new user with respect to the at least one sound source. Beneficially, in such a case, the audio scene is re-created from the perspective of the at least one new user by simulating a change in an orientation of the at least one new user with respect to the at least one sound source and/or a distance of the at least one new user from the at least one sound source. Moreover, re-creating the at least one sound in this manner provides a sense of directionality of the at least one sound to the at least one new user. Thus, a seamless and an immersive audio experience is provided to the at least one new user. It will be appreciated that when re-creating the at least one sound, the at least one processor may also take into account an obstruction/occlusion (for example, due to presence of some object) between the at least one sound and the at least one new user. In such a case, the at least one processor may filter the at least one sound accordingly for re-creation purposes. It will also be appreciated that when the at least one new user moves within the given reconstructed environment or a head pose of the at least one new user changes, relative positions of the at least one new user with respect to the at least one sound source could be updated, and re-creation of the at least one sound could be performed accordingly.

Optionally, the at least one sound comprises a plurality of sounds, and the at least one sound source comprises a plurality of sound sources. Optionally, in this regard, the at least one processor is configured to:

determine different portions of the plurality of acoustic signals corresponding to the plurality of sounds;

process the different portions of the plurality of acoustic signals separately to estimate respective sound directions from which the plurality of sounds are incident upon the plurality of microphones, based on the positions and the orientations of the plurality of microphones;

determine positions of the plurality of sound sources from which the plurality of sounds emanated, based on a correlation between the 3D model and the respective sound directions; and re-create the plurality of sounds from the perspective of the at least one new user, based on relative positions of the at least one new user with respect to the plurality of sound sources.

Thus, it will be appreciated that the aforementioned acoustic apparatus is susceptible to be used in real-world environments where several sound sources produce different sounds simultaneously, and yet is capable of providing a highly realistic and immersive audio experience to users.

The present disclosure also relates to the method as described above. Various embodiments and variants disclosed above, with respect to the aforementioned first aspect, apply mutatis mutandis to the method.

In an embodiment, in the method, the step of processing the plurality of acoustic signals is performed by using beamforming.

In an additional embodiment, in the method, the step of processing the plurality of acoustic signals comprises calculating an angle of incidence of the at least one sound for each of the plurality of microphones, based on at least one parameter of each of the plurality of acoustic signals and distances between the plurality of microphones.

In an additional or alternative embodiment, in the method, the step of processing the plurality of acoustic signals comprises:

creating a spherical sound field, based on at least one parameter of each of the plurality of acoustic signals and the positions and orientations of the plurality of microphones; and determining an angle of incidence of the at least one sound for an origin of the spherical sound field.

Optionally, in the method, the plurality of microphones are arranged in a form of an Ambisonic array, wherein the spherical sound field is created with respect to an origin of the Ambisonic array.

Optionally, the plurality of microphones are mounted on a head-mounted display apparatus of a first user, wherein the method further comprises:

receiving information indicative of a head pose of the first user;

determining a change in the head pose of the first user over a given time period during which the plurality of acoustic signals are collected;

determining a change in the positions and the orientations of the plurality of microphones, based on the change in the head pose of the first user; and processing the plurality of acoustic signals, based further on the change in the positions and the orientations of the plurality of microphones, for determining the sound direction.

Optionally, the method further comprises:

determining a conical region of interest in the 3D model, wherein an axis of the conical region of interest is the estimated sound direction;

identifying at least one object that is present at least partially in the conical region of interest; and considering the at least one object as the at least one sound source.

Optionally, the method further comprises identifying an object category of the at least one object, wherein the at least one object is considered as the at least one sound source, when the object category of the at least one object matches the at least one sound.

DETAILED DESCRIPTION OF THE DRAWINGS

Referring to FIG. 1, illustrated is a block diagram of an architecture of an acoustic apparatus 100 for re-creating an acoustic scene from spatial locations of sound sources, in accordance with an embodiment of the present disclosure. The acoustic apparatus 100 comprises a plurality of microphones (depicted as microphones 102*a* and 102*b*), and at least one processor (depicted as a processor 104).

It may be understood by a person skilled in the art that FIG. 1 includes a simplified architecture of the acoustic apparatus 100, for sake of clarity, which should not unduly limit the scope of the claims herein. It is to be understood that the specific implementation of the acoustic apparatus 100 is provided as an example and is not to be construed as limiting it to specific numbers or specific types of microphones and processors. The person skilled in the art will recognize many variations, alternatives, and modifications of embodiments of the present disclosure.

Figure 2A:
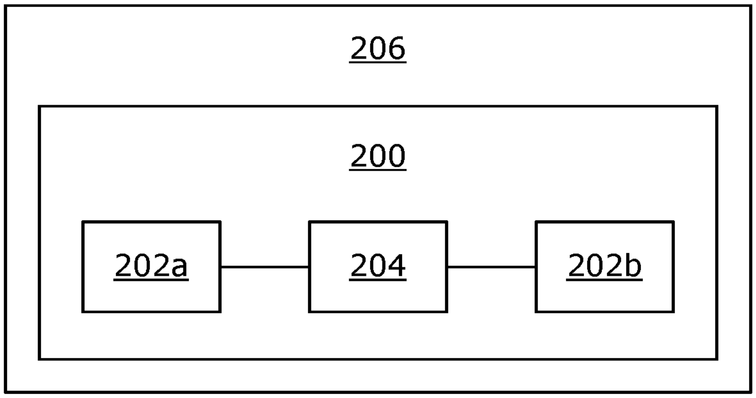
FIGS. 2A and 2B illustrate exemplary implementations of an acoustic apparatus for re-creating acoustic scene from spatial locations of sound sources, in accordance with different embodiments of the present disclosure.
Figure 2B:
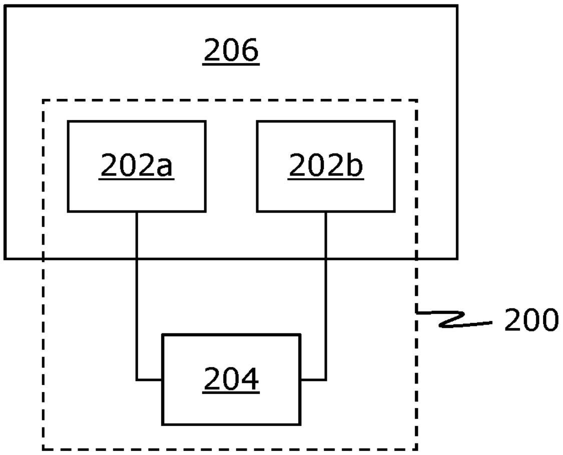

Referring to FIGS. 2A and 2B, illustrated are exemplary implementations of an acoustic apparatus 200 for re-creating an acoustic scene from spatial locations of sound sources, in accordance with different embodiments of the present disclosure. With reference to FIGS. 2A and 2B, the acoustic apparatus 200 comprises a plurality of microphones (depicted as microphones 202*a* and 202*b*), and at least one processor (depicted as a processor 204). With reference to FIG. 2A, the acoustic apparatus 200 is integrated with a head-mounted display (HMD) apparatus 206 such that all elements (i.e., the microphones 202*a* and 202*b* and the processor 204) of the acoustic apparatus 200 are arranged on the HMD apparatus 206. With reference to FIG. 2B, the acoustic apparatus 200 is implemented in a distributed manner, such that the microphones 202*a* and 202*b* are arranged on the HMD apparatus 206, and the processor 204 is optionally implemented as at least one server that is communicably coupled to the HMD apparatus 206.

Figure 3A:
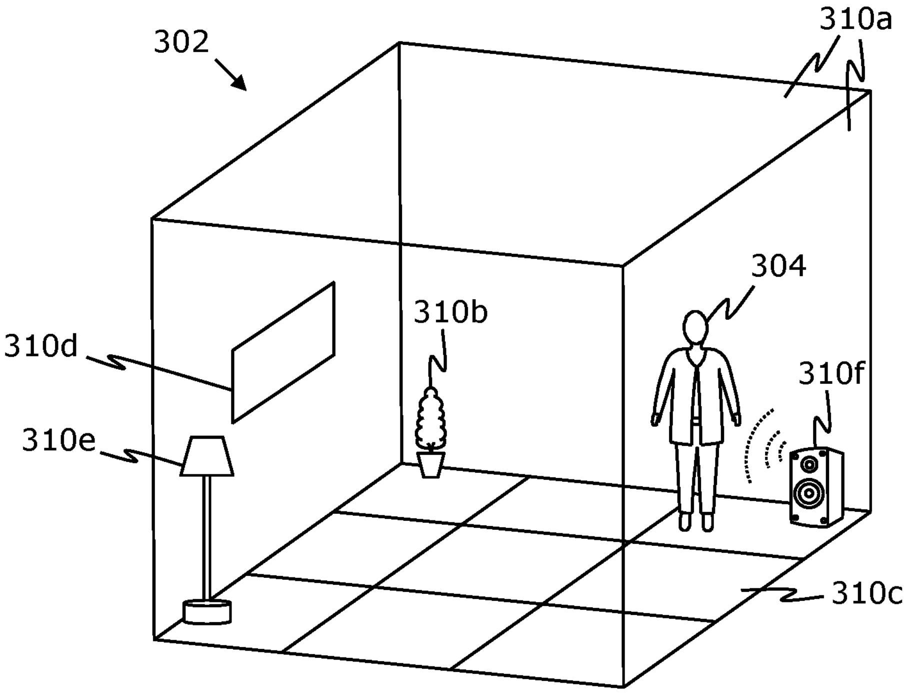
Figure 3B:
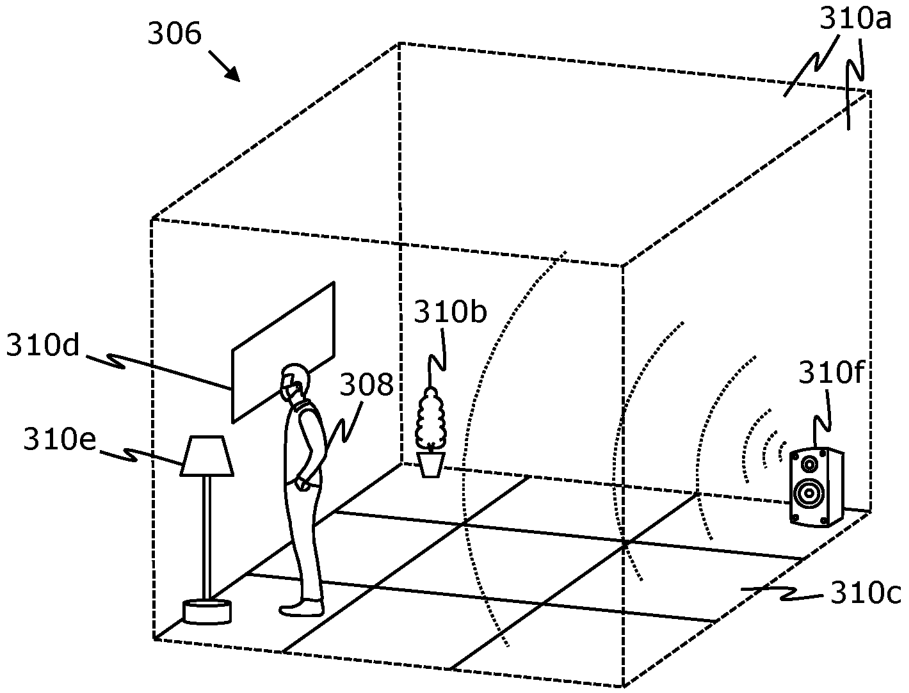
FIG. 3B illustrates a schematic illustration of a reconstructed environment in which a new user is present, in accordance with an embodiment of the present disclosure.

Referring to FIGS. 3A and 3B, FIG. 3A is a schematic illustration of a three-dimensional (3D) space of a real-world environment 302 in which a first user 304 is present, while FIG. 3B illustrates a schematic illustration of a reconstructed environment 306 in which a new user 308 is present, in accordance with an embodiment of the present disclosure. With reference to FIG. 3A, the real-world environment 302 represents a living room comprising a plurality of objects 310*a*, 310*b*, 310*c*, 310*d*, 310*e* and 310*f*, depicted as walls, an indoor plant, a tiled floor, a television, a lamp, and a speaker, respectively. Herein, microphones (not shown) are employed to sense a sound emanating from a sound source, for example, such as the object 310*f* (namely, the speaker) in the real-world environment 302, and a position of the sound source is determined, the microphones being mounted on a head-mounted display apparatus (not shown) of the first user 304.

With reference to FIG. 3B, the reconstructed environment 306 is reconstructed from a 3D model of the real-world environment 302, and thus represents a same living room comprising the plurality of objects 310*a*-310*f*. Herein, the sound emanating from the object 310*f* (namely, the speaker acting as the sound source) is re-created from a perspective of the new user 308, based on a relative position of the new user 308 with respect to the sound source. In this case, an audio scene is re-created from the perspective of the new user 308 by simulating an orientation of the new user 308 with respect to the sound source and/or a distance of the new user 308 from the sound source, thereby providing a sense of directionality of the sound to the new user 308.

Figure 4:
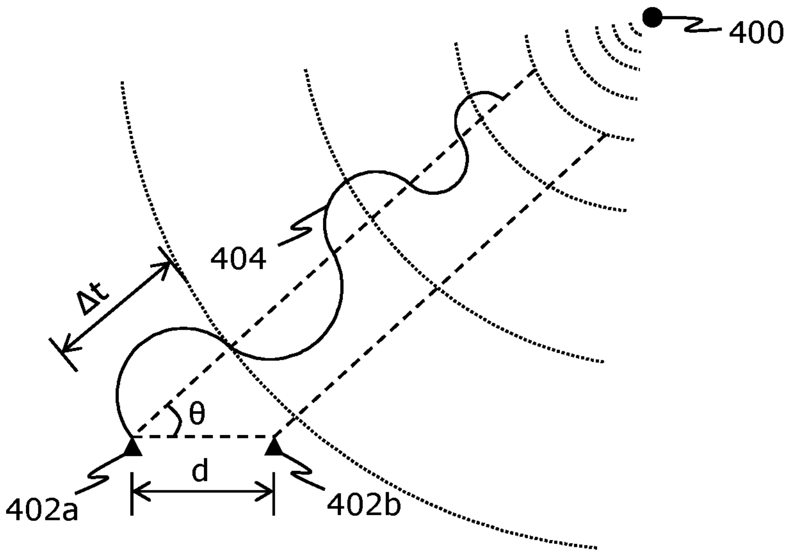
FIG. 4 illustrates a schematic illustration of determining a sound direction by using beamforming, in accordance with an embodiment of the present disclosure.

FIG. 4 is a schematic illustration of how a sound direction can be estimated using beamforming, in accordance with an embodiment of the present disclosure. Herein, a sound source 400 (depicted using a solid black dot) is shown to emanate a sound in a real-world environment, and two microphones 402*a* and 402*b* (depicted using two solid black triangles) arranged in the form of a beamforming array are shown to be employed for sensing the sound and generating corresponding acoustic signals (for example, depicted using a sine wave 404 for the microphone 402*a*). A distance between the two microphones 402*a* and 402*b* is known and is equal to 'd'. When the sound emanating from the sound source 400 propagates in the real-world environment, said sound first arrives at the microphone 402*b*, and then arrives at the microphone 402*b* due to a difference in a distance between the sound source 400 and each of the two microphones 402*a* and 402*b*. A difference in an arrival time (namely, a time delay) of the sound is determined for the microphone 402*a* with respect to the microphone 402*b* as '$\Delta t$'. Thus, an angle of incidence of the sound can be calculated by using a trigonometry-based formula (for example, such as cosine $\theta = d/\Delta t$), wherein the sound direction is along an angle of incidence '$\theta$'.

Figure 5A:
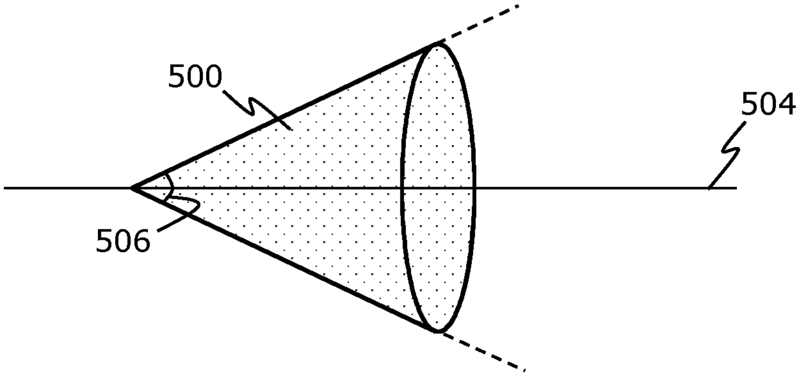
Figure 5B:
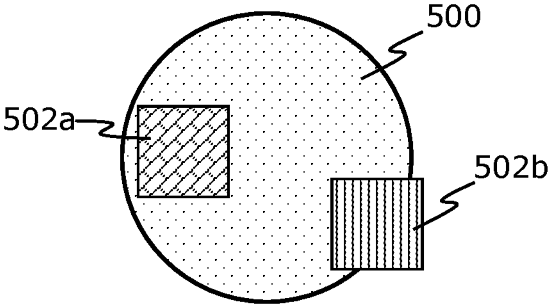
FIG. 5B is a front view of the conical region illustrating objects present at least partially in the conical region of interest, in accordance with an embodiment of the present disclosure.

Referring to FIGS. 5A and 5B, FIG. 5A is a side view of a conical region of interest 500 (depicted using a dotted pattern), while FIG. 5B is a front view of the conical region 500 illustrating objects 502*a* (depicted using diagonal brick pattern) and 502*b* (depicted using vertical stripes pattern) present at least partially in the conical region of interest 500, in accordance with an embodiment of the present disclosure. With reference to FIGS. 5A and 5B, the conical region of interest 500 is determined in a 3D model (not shown) of a real-world environment, wherein an axis 504 of the conical region of interest 500 is a sound direction that is estimated by processing a plurality of acoustic signals collected by a plurality of microphones. The conical region of interest 500 has an apex angle 506. With reference to FIG. 5B, the object 502*a* is fully present in the conical region of interest 500, while the object 502*b* is partially present in the conical region of interest 500. In an example, the object 502*a* may be considered as a sound source from which a sound is emanated and is incident upon the plurality of microphones.

FIGS. 2A-2B, 3A-3B, 4, and 5A-5B are merely examples, which should not unduly limit the scope of the claims herein. The person skilled in the art will recognize many variations, alternatives, and modifications of embodiments of the present disclosure.

Figure 6:
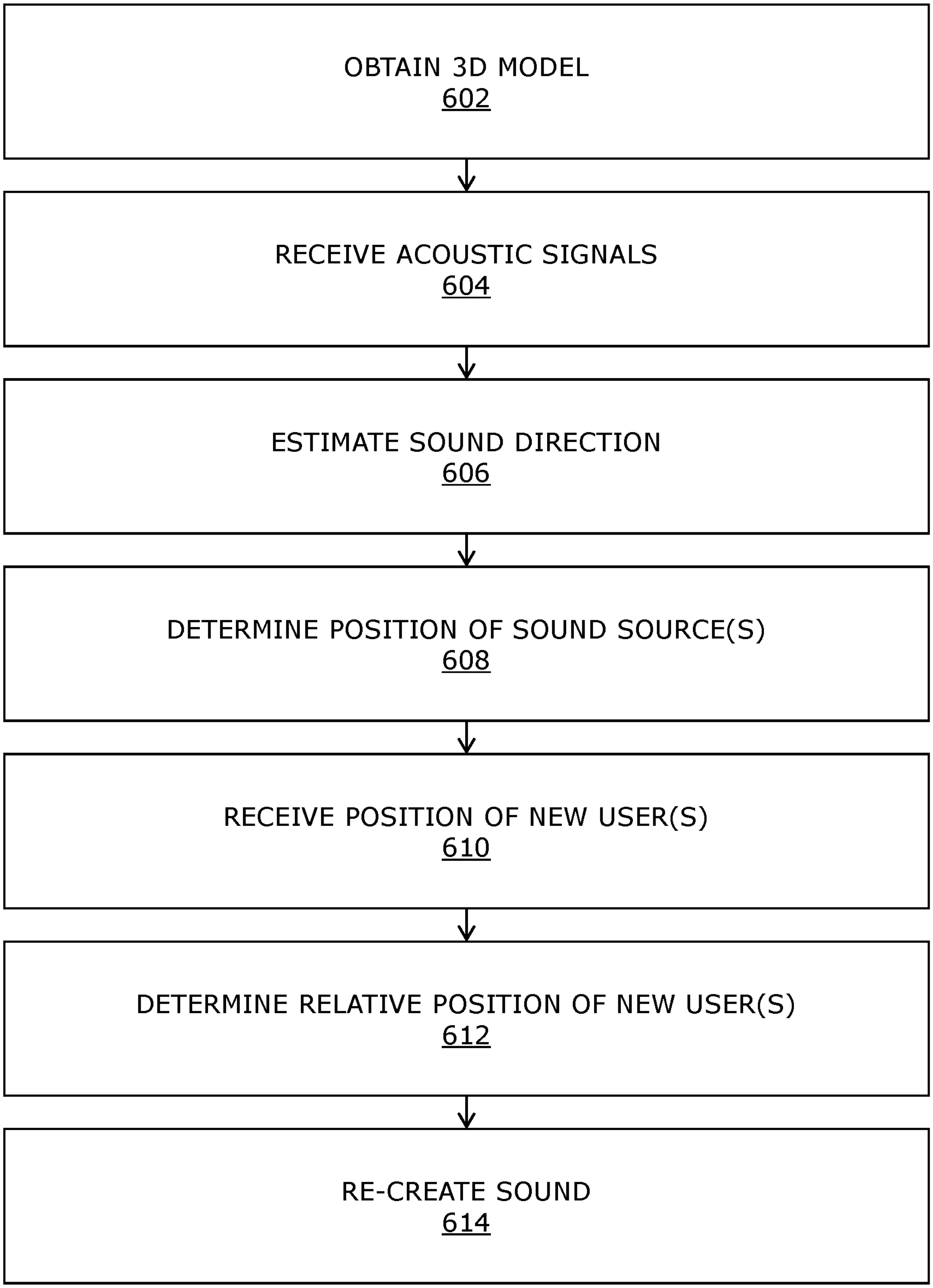
FIG. 6 illustrates steps of a method for re-creating acoustic scene from spatial locations of sound sources, in accordance with an embodiment of the present disclosure.

Referring to FIG. 6, illustrated are steps of a method for re-creating acoustic scene from spatial locations of sound sources, in accordance with an embodiment of the present disclosure. At step 602, a three-dimensional (3D) model of the real-world environment is obtained, the 3D model being represented in a given coordinate space. At step 604, a plurality of acoustic signals that are collected simultaneously by a plurality of microphones, are received. At step 606, the plurality of acoustic signals are processed, based on positions and orientations of the plurality of microphones in the given coordinate space, to estimate a sound direction from which at least one sound corresponding to the plurality of acoustic signals is incident upon the plurality of microphones. At step 608, a position of at least one sound source is determined, in the given coordinate space, from which the at least one sound emanated, based on a correlation between the 3D model and the estimated sound direction. At step 610, information indicative of a position of at least one new user in a given reconstructed environment is received, the given reconstructed environment being reconstructed from the 3D model of the real-world environment, and the position of the at least one new user being represented in the given coordinate space. At step, 612, a relative position of the at least one new user with respect to the at least one sound source is determined, based on the position of the at least one new user and the position of the at least one sound source. At step 614, the at least one sound from a perspective of the at least one new user is re-created, based on the relative position of the at least one new user with respect to the at least one sound source. The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An acoustic apparatus comprising:

a plurality of microphones that are to be employed to sense sounds in a real-world environment and generate corresponding acoustic signals; and at least one processor configured to:

obtain a three-dimensional (3D) model of the real-world environment, the 3D model being represented in a given coordinate space;

receive a plurality of acoustic signals that are collected simultaneously by the plurality of microphones;

process the plurality of acoustic signals, based on positions and orientations of the plurality of microphones in the given coordinate space, to estimate a sound direction from which at least one sound corresponding to the plurality of acoustic signals is incident upon the plurality of microphones;

determine a position of at least one sound source, in the given coordinate space, from which the at least one sound emanated, based on a correlation between the 3D model and the estimated sound direction;

receive information indicative of a position of at least one new user in a given reconstructed environment that is reconstructed from the 3D model of the real-world environment, the position of the at least one new user being represented in the given coordinate space;

determine a relative position of the at least one new user with respect to the at least one sound source, based on the position of the at least one new user and the position of the at least one sound source; and re-create the at least one sound from a perspective of the at least one new user, based on the relative position of the at least one new user with respect to the at least one sound source.

2. The acoustic apparatus of claim 1, wherein the plurality of acoustic signals are processed to determine the sound direction by using beamforming.

3. The acoustic apparatus of claim 1, wherein when processing the plurality of acoustic signals, the at least one processor is configured to calculate an angle of incidence of the at least one sound for each of the plurality of microphones, based on at least one parameter of each of the plurality of acoustic signals and distances between the plurality of microphones.

4. The acoustic apparatus of claim 1, wherein when processing the plurality of acoustic signals, the at least one processor is configured to:

create a spherical sound field, based on at least one parameter of each of the plurality of acoustic signals and the positions and orientations of the plurality of microphones; and determine an angle of incidence of the at least one sound for an origin of the spherical sound field.

5. The acoustic apparatus of claim 4, wherein the plurality of microphones are arranged in a form of an Ambisonic array, wherein the spherical sound field is created with respect to an origin of the Ambisonic array.

6. The acoustic apparatus of claim 1, wherein the plurality of microphones are mounted on a head-mounted display apparatus of a first user, wherein the at least one processor is configured to:

receive information indicative of a head pose of the first user;

determine a change in the head pose of the first user over a given time period during which the plurality of acoustic signals are collected;

determine a change in the positions and the orientations of the plurality of microphones, based on the change in the head pose of the first user; and process the plurality of acoustic signals, based further on the change in the positions and the orientations of the plurality of microphones, to determine the sound direction.

7. The acoustic apparatus of claim 1, wherein the at least one processor is configured to:

determine a conical region of interest in the 3D model, wherein an axis of the conical region of interest is the estimated sound direction;

identify at least one object that is present at least partially in the conical region of interest; and consider the at least one object as the at least one sound source.

8. The acoustic apparatus of claim 7, wherein the at least one processor is configured to identify an object category of the at least one object, wherein the at least one object is considered as the at least one sound source, when the object category of the at least one object matches the at least one sound.

9. A method comprising:

obtaining a three-dimensional (3D) model of a real-world environment, the 3D model being represented in a given coordinate space;

receiving a plurality of acoustic signals that are collected simultaneously by a plurality of microphones, wherein the plurality of microphones are employed to sense sounds in the real-world environment and to generate corresponding acoustic signals;

processing the plurality of acoustic signals, based on positions and orientations of the plurality of microphones in the given coordinate space, to estimate a sound direction from which at least one sound corresponding to the plurality of acoustic signals is incident upon the plurality of microphones;

determining a position of at least one sound source, in the given coordinate space, from which the at least one sound emanated, based on a correlation between the 3D model and the estimated sound direction;

receiving information indicative of a position of at least one new user in a given reconstructed environment that is reconstructed from the 3D model of the real-world environment, the position of the at least one new user being represented in the given coordinate space;

determining a relative position of the at least one new user with respect to the at least one sound source, based on the position of the at least one new user and the position of the at least one sound source; and re-creating the at least one sound from a perspective of the at least one new user, based on the relative position of the at least one new user with respect to the at least one sound source.

10. The method of claim 9, wherein the step of processing the plurality of acoustic signals is performed by using beamforming.

11. The method of claim 9, wherein the step of processing the plurality of acoustic signals comprises calculating an angle of incidence of the at least one sound for each of the plurality of microphones, based on at least one parameter of each of the plurality of acoustic signals and distances between the plurality of microphones.

12. The method of claim 9, wherein the step of processing the plurality of acoustic signals comprises:

creating a spherical sound field, based on at least one parameter of each of the plurality of acoustic signals and the positions and orientations of the plurality of microphones; and determining an angle of incidence of the at least one sound for an origin of the spherical sound field.

13. The method of claim 12, wherein the plurality of microphones are arranged in a form of an Ambisonic array, wherein the spherical sound field is created with respect to an origin of the Ambisonic array.

14. The method of claim 9, wherein the plurality of microphones are mounted on a head-mounted display apparatus of a first user, and wherein the method further comprises:

receiving information indicative of a head pose of the first user;

determining a change in the head pose of the first user over a given time period during which the plurality of acoustic signals are collected;

determining a change in the positions and the orientations of the plurality of microphones, based on the change in the head pose of the first user; and processing the plurality of acoustic signals, based further on the change in the positions and the orientations of the plurality of microphones, for determining the sound direction.

15. The method of claim 9, further comprising:

determining a conical region of interest in the 3D model, wherein an axis of the conical region of interest is the estimated sound direction;

identifying at least one object that is present at least partially in the conical region of interest; and considering the at least one object as the at least one sound source.

16. The method of claim 15, further comprising identifying an object category of the at least one object, wherein the at least one object is considered as the at least one sound source, when the object category of the at least one object matches the at least one sound.

* * * * *